(12) United States Patent
Gauthier

(10) Patent No.: US 12,444,180 B2
(45) Date of Patent: Oct. 14, 2025

(54) LIVE BIOMETRIC ENGINE PERFORMANCE MEASUREMENT

(71) Applicant: Entrust Corporation, Shakopee, MN (US)

(72) Inventor: Richard Gauthier, Ottawa (CA)

(73) Assignee: Entrust Corporation, Shakopee, MN (US)

( * ) Notice: Subject to any disclaimer, the term of this patent is extended or adjusted under 35 U.S.C. 154(b) by 346 days.

(21) Appl. No.: 18/314,390

(22) Filed: May 9, 2023

(65) Prior Publication Data

US 2023/0360378 A1 Nov. 9, 2023

Related U.S. Application Data

(60) Provisional application No. 63/339,780, filed on May 9, 2022.

(51) Int. Cl.
| | |
|---|---|
| G06K 9/00 | (2022.01) |
| G06V 10/74 | (2022.01) |
| G06V 10/776 | (2022.01) |
| G06V 40/16 | (2022.01) |
| G06V 40/50 | (2022.01) |

(52) U.S. Cl.
CPC ............ *G06V 10/776* (2022.01); *G06V 10/74* (2022.01); *G06V 40/172* (2022.01); *G06V 40/50* (2022.01)

(58) Field of Classification Search
CPC ........... G06F 21/32; G06T 2207/30196; G06T 2207/30201; G06V 40/10; G06V 40/15; G06V 40/155; G06V 40/40; G06V 40/45; G06V 40/50; G06V 40/53; G06V 40/55; G06V 40/70; G06V 40/16; G06V 40/165; G06V 40/168; G06V 40/169; G06V 40/171; G06V 40/172; G06V 40/173; G06V 40/174; G06V 40/176; G06V 40/175; G06V 40/178; G06V 40/179; G06V 30/1918; G06V 40/18; G06V 40/197; G06V 40/193; H04L 63/0861; H04N 1/442

See application file for complete search history.

(56) References Cited

U.S. PATENT DOCUMENTS

| | | | |
|---|---|---|---|
| 2017/0063852 A1* | 3/2017 | Azar | G06V 40/70 |
| 2017/0140212 A1* | 5/2017 | Lo | G06V 40/171 |
| 2019/0042835 A1* | 2/2019 | Mostafa | G06F 21/32 |
| 2019/0065833 A1* | 2/2019 | Wang | G06V 20/46 |
| 2021/0182373 A1* | 6/2021 | Tussy | G06F 21/32 |

OTHER PUBLICATIONS

International Search Report and Written Opinion for PCT/US2023/066787 dated May 9, 2023 (9 pages).

* cited by examiner

*Primary Examiner* — Avinash Yentrapati
(74) *Attorney, Agent, or Firm* — Merchant & Gould, P.C.

(57) ABSTRACT

Methods and systems for measuring true positive and false positive matching rates for a given biometric engine within an operational environment are provided. In some examples, a test, or candidate, biometric engine may be executed, or utilized, in parallel with a production biometric engine, on biometric data that is available during live operation of the production biometric engine. Performance of a biometric engine can be assessed, as to both true positive and false positive matching. Additionally, where multiple biometric engines are assessed concurrently, a candidate biometric engine may be compared to performance of the production biometric engine to determine whether a change or upgrade is advisable.

21 Claims, 6 Drawing Sheets

LIVE BIOMETRIC ENGINE PERFORMANCE MEASUREMENT

CROSS-REFERENCE TO RELATED APPLICATIONS

The present application claims priority from U.S. Provisional Patent Application No. 63/339,780, filed on May 9, 2022, the disclosure of which is hereby incorporated by reference in its entirety.

BACKGROUND

Biometric systems, such as biometric identity matching and verification systems, may be implemented in a number of ways. One example of a biometric identity verification system involves matching images of individuals. Typically, in such image-based biometric identity verification systems, an identity image (e.g., an image extracted from an identification document, such as a driver's license, passport, or other government-issued document) is matched or compared against an "enrollment" image (e.g., an image of the individual that is captured at the time of biometric verification, for example for enrollment purposes) to perform identity verification. This often requires a biometric engine capable of matching specific biometric characteristics of the individual depicted in the image(s).

A direct, one-to-one correspondence between enrollment biometric data and identifying biometric data is critical as part of an identity verification process. That is, obtained biometric data at a time of identity verification should match to one matching piece of enrollment biometric data.

A variety of biometric engines are available from vendors, each of which perform a comparison of enrollment data to biometric data obtained at the time of identity verification. The vendors, or suppliers, of such software largely make claims regarding the performance of that software in terms of its accuracy, speed, and the like. Additionally, third party, independent studies (e.g. by the National Institute of Standards and Technology, or NIST), are provided that study accuracy of such biometric engines. However, both vendor claims and independent studies do not often reflect real life use cases, and as such, represent significant risk of misoperation, and therefore inaccurate identity verification.

SUMMARY

In general terms, the present disclosure is directed to methods and systems for measuring true positive and false positive matching rates for a given biometric engine within an operational environment are provided. In some examples, a test, or candidate, biometric engine may be executed, or utilized, in parallel with a production biometric engine, on biometric data that is available during live operation of the production biometric engine. Performance of a biometric engine can be assessed, as to both true positive and false positive matching. Additionally, where multiple biometric engines are assessed concurrently, a candidate biometric engine may be compared to performance of the production biometric engine to determine whether a change or upgrade is advisable.

In a first particular aspect, a method of assessing performance of a candidate biometric engine is provided. The method includes receiving biometric data of an individual at a biometric engine associated with an identity platform, and comparing the biometric data to reference biometric data of the individual at the biometric engine to validate a match between the biometric data and the reference biometric data. The method also includes comparing the reference biometric data of the individual against biometric data of one or more other individuals interacting with the identity platform concurrently with the individual to validate non-matches between the reference biometric data of the individual and the biometric data of the one or more other individuals, and determining, based on the validated match and the validated non-matches, a performance of the biometric engine concurrent with live operation of the biometric engine at the identity platform.

In a second particular aspect, a live biometric engine assessment system includes a computing system including a memory and a processing unit. The memory stores instructions which, when executed, cause the computing system to: receive biometric data of an individual at a biometric engine associated with an identity platform, the biometric data including enrollment data and reference data; compare the enrollment data to the reference data of the individual at the biometric engine to validate a match between the biometric data and the reference data; compare the reference data of the individual against enrollment data of one or more other individuals interacting with the identity platform concurrently with the individual to validate, at the biometric engine, non-matches between the reference data of the individual and the biometric data of the one or more other individuals; and determine, based on the validated match and the validated non-matches, a performance of the biometric engine concurrent with live operation of the biometric engine at the identity platform.

In a third particular aspect, a live testing platform useable to test a plurality of biometric engines including at least a production biometric engine and a candidate biometric engine is disclosed. The live testing platform includes at least one computing system including a memory and a processing unit. The memory stores instructions which, when executed by the processing unit, cause the live testing platform to perform a method including receiving image data of an individual at the production biometric engine and the candidate biometric engine, the image data including an enrollment image and a document image. The method includes performing a reference biometric matching analysis and performing a candidate biometric matching analysis. The reference biometric matching analysis includes: comparing the enrollment image of the individual to the document image of the individual at the production biometric engine to validate a match between the biometric data and the reference biometric data; comparing other enrollment images of one or more other individuals interacting with the identity platform concurrently with the individual to the document image of the individual at the production biometric matching engine to validate non-matches between the other enrollment images and the document image; and determining, based on the validated match and the validated non-matches using the production biometric engine, a performance of the production biometric matching engine. The candidate biometric matching analysis includes comparing the enrollment image of the individual to the document image of the individual at the candidate biometric engine to validate a match between the biometric data and the reference biometric data; comparing other enrollment images of the one or more other individuals interacting with the identity platform concurrently with the individual to the document image of the individual at the candidate biometric engine to validate non-matches between the other enrollment images and the document image; and determining, based on the validated match and the validated non-matches using the candidate biometric engine, a performance of the candidate biometric engine. The method further includes comparing performance of the candidate biometric engine to the production biometric engine.

DETAILED DESCRIPTION

Figure 1:
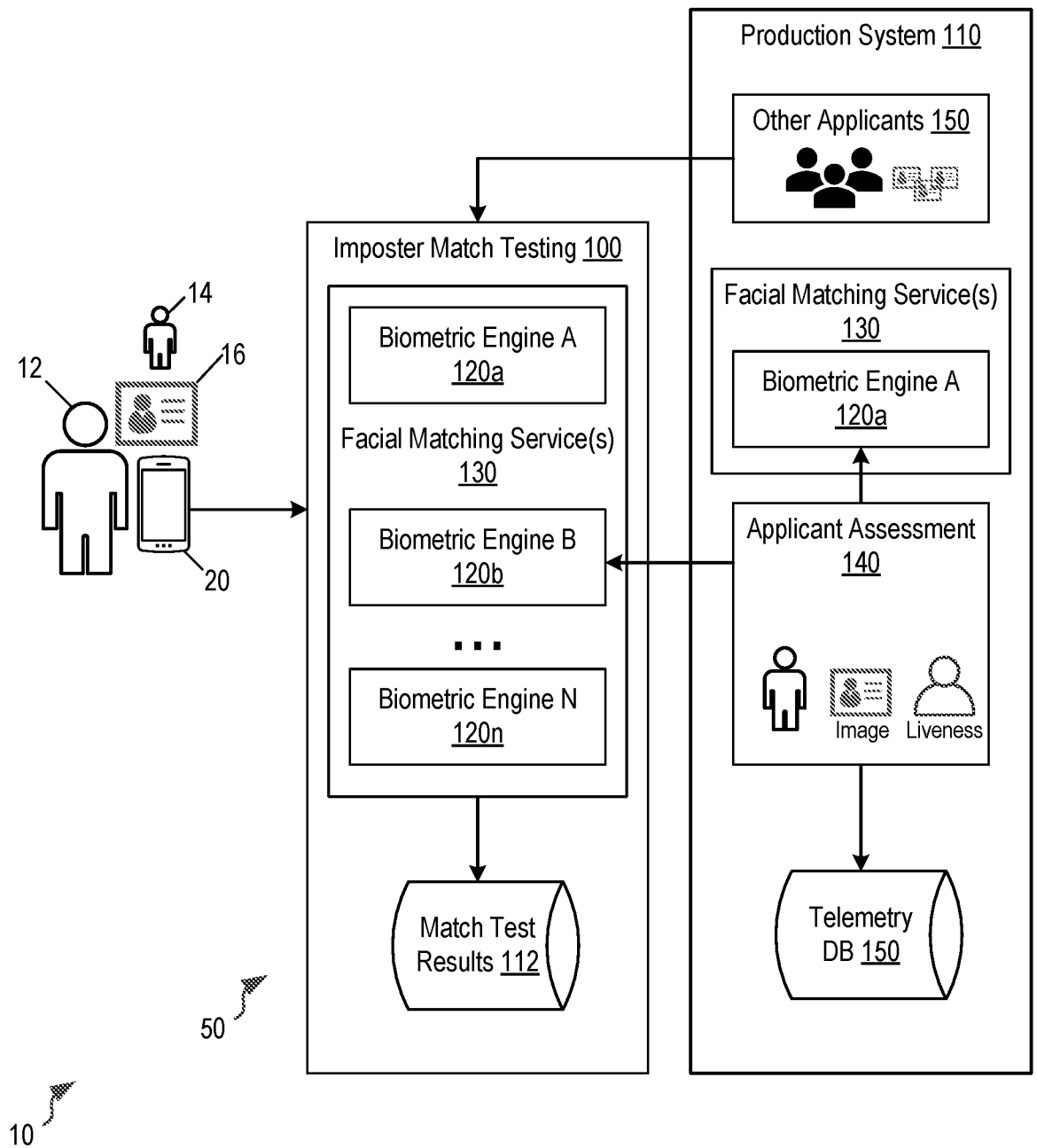
FIG. 1 illustrates a live biometric engine performance assessment architecture, according to an example embodiment.

As briefly described above, embodiments of the present invention are directed to methods and systems for measuring true positive and false positive matching rates for a given biometric engine within an operational environment. In some examples, a test, or candidate biometric engine may be executed, or utilized, in parallel with a production biometric engine. Performance of the candidate biometric engine may be compared to performance of the production biometric engine to determine whether a change or upgrade is advisable.

In example implementations, the methods and systems may be implemented using a comparison of biometric engines that analyze images. In particular, in some instances the candidate biometric engine and production biometric engine may analyze facial image data. In such example implementations, a "document image" of an individual, such as a facial image of an individual presented on an identification document such as a passport, driver's license, or other identification document, may be compared against facial images captured during an enrollment process (e.g., referred to as "enrollment images" or otherwise "current biometric data" of a user). The document image may be compared against facial images of not only the same user, but other users as well. As such, a given biometric engine may be assessed to determine the extent to which it may match the document image to more than one enrollment image (i.e., to enrollment images of other individuals).

In some instances, both enrollment images and document images are pre-sorted into various demographic criteria, and the matching process is performed on image data within the same demographic criteria. For example, images may be compared within the same grouping of individuals based on one or more of gender, age range, or nationality group.

In further instances, more than a single biometric engine may be assessed concurrently. Because two or more biometric engines may be utilized on the same sets of biometric data (e.g., the same enrollment images and document images), comparative accuracy and performance of those biometric engines may be accurately assessed in real-world conditions.

In some examples, a set of telemetry data may be maintained, which includes a set of positive matching samples and negative matching samples between the facial images and enrollment photos. The telemetry data may be used, either in place of or in addition to live facial images, to ensure adequate test coverage of both true positives and false positives when matching a document photo against a given set of enrollment photos.

Overall, the present methods and systems provides significant advantages relative to existing solutions. For example, the methods and systems described herein allow for assessment of a performance of a biometric engine using real-world data, concurrently with operation of a production system. The biometric engine may be assessed to determine its performance over time, or two or more different biometric engines may be assessed concurrently to determine comparative performance on the same set of data. This comparative performance allows for an apples to apples performance assessment on real-world data that will allow administrative users to readily view and adopt a highest performing biometric engine. As new biometric engines become available, this streamlines a process of validation of those biometric engines without affecting performance of an underlying production system, and without relying on potentially nonrepresentative test or simulation data that would otherwise have been used to assess biometric engine performance.

FIG. 1 illustrates a live biometric engine performance assessment system 10, according to an example embodiment. The live biometric engine performance assessment system 10 may be implemented within the context of an identity verification platform, such as may be used by one or more governmental entities or companies to manage individual identity information. In particular, the live biometric engine performance assessment system 10 may be used in circumstances where biometric information, such as facial images, are used for identity verification.

In the example shown, an individual 12 may utilize a computing device, such as a mobile device 20, to access an identity verification platform 50 that can include both an imposter match testing system 100 and a production system 110. The individual 12 may access the identity verification platform for a variety of purposes, for example to enroll himself or herself within such an identity verification system for later use. This can include, for example, obtaining issuance of a new governmental identification card or digital identification card, or any other types of identification process that may require use of biometric data.

In the example shown, the imposter match testing system 100 includes one or more facial matching services 130. The facial matching services may be implemented using a biometric engine 120. In the example shown, a plurality of biometric engines 120a-n are provided. However, it is recognized that one or more such biometric engines may be implemented within the imposter match testing system 100.

Generally speaking the facial matching services 130, and in particular each biometric engine 120, may be configured to compare two pieces of biometric data, in particular to images of individuals, to determine a confidence of matching between the two images based on biometric features. For example, a first image may be compared to a second image of the same individual, and a high confidence (greater than a threshold percentage, say 45-70%) may indicate the existence of a match between the two images, thereby indicating that the images are of the same individual. However, a first image of the individual may be compared to a second image of a different individual, and a low confidence (less than the threshold percentage, say 45-70%) may indicate a non-match between the two images, indicating that the images are of different individuals.

Within the imposter match testing system 100, each of the biometric engines 120*a*-*n* may implement a different algorithm or have a different set of settings used to determine the existence of a match between two pieces of biometric data (e.g., facial images). Accordingly, each of the biometric engines 120*a*-*n* may output, for the same two pieces of biometric data, a different confidence of match. As such, each of the biometric engines 120*a*-*n* may provide a different performance, or accuracy, on a given data set. As biometric data is provided to each of the biometric engines 120*a*-*n*, statistics regarding test results from each of those biometric engines may be provided to, and stored in, a match test results database 112. Such matched test results may be used, for example, to generate analyses of performance of an individual biometric engine 120, or comparative performance between two or more biometric engines. An example of a display of comparative performance between two biometric engines is described in further detail below in conjunction with FIG. 4.

In the example shown, the production system 110 also includes facial matching services 130 including at least one biometric engine 120 (in the example shown, biometric engine 120*a*). The selected biometric engine included within the production system 110 may be referred to as the production biometric engine, since it is the selected biometric engine currently in use by the production system for live biometric validation of individuals.

In the example production system 110 as shown, the facial matching services 130 are only one portion of the biometric validation processes performed. In example systems, and applicant assessment engine 140 may perform one or more additional individual identity assessments, for example to validate other data obtained regarding the individual submitting the biometric data. For example, in the context of an identity verification platform used in a system for generating government identification documents, a first piece of biometric data may be an enrollment image capture of the individual 12, and a second piece of monitor data can correspond to a document image, such as an image of the individual appearing on a passport, driver's license, or other government identity document. When the image appearing on the government identity document is captured, other data regarding the individual, such as name, address, age, nationality, and the like, may be captured and validated, as well as used to tag the enrollment image that is received. In some instances, the applicant assessment engine 140 may perform a liveness check on the individual, for example to determine that the individual currently interacting with the production system 110 is in fact a live human, rather than an automated submission or a submission based on previously captured data, e.g., by an imposter. Other data requests and inputs may be required as well by the production system before an overall enrollment process is completed.

In some instances, an overall enrollment process for a single individual may take 5-30 minutes, or in some instances longer if the user is required to supply different data (e.g., re-entering identifying information, resupplying a clearer version of a facial image, or the like). In some instances, individuals may abandon or pause the enrollment process; in such instances, there may be a policy maintained in place by an administrative user to preserve the submitted biometric data of an individual for a predetermined amount of time (e.g., 1-2 hours, or some other time based on data privacy requirements in effect). Once an enrollment process is completed, or aborted and a timeout has been reached, the biometric data of the user may be deleted for privacy and security.

Data regarding each of the assessments performed by the applicant assessment engine 140, as well as the assessments performed by the facial matching service 130, may be stored within a telemetry database 150 of the production system 110. The telemetry database 150 may, for example, store information about current operation of the production system, including numbers of individuals currently using the production system, operational performance of the facial matching services 130 including the biometric engine 120*a*, and performance of the applicant assessment engine 140. Optionally, these details, or the outputs of the applicant assessment and facial matching performed by the biometric engine 120*a* may be output to a downstream system, for example for further processing and issuance of a physical government ID or the like.

It is noted that, in operation, the production system 110 may be used to interact with a relatively large number of individuals 12 at the same time, given the amount of time an overall enrollment process may require for each user. Accordingly, the production system 110 may have access to submitted facial images of a large number of individuals at any given time. Such information, shown in FIG. 1 as other applicant information in a telemetry database 150, may be provided back to the imposter match testing system 100, for further analysis of performance of one or more biometric engines 120*a*-*n*.

In operation, the live biometric engine performance assessment system 10 may be utilized as follows. Individuals 12 may use computing devices, e.g. mobile device 20, to submit biometric data to an identity verification platform 50. The biometric data may include, for example, enrollment biometric data, such as an enrollment image 14, as well as reference biometric data, such as a document image 16 from an identification document of the individual. The enrollment image 14 and document image 16 (in some instances, referred to as an enrollment photo and a document photo, respectively) are received at an imposter match testing system 100, and provided to facial matching services 130. The enrollment image 14 and document image 16 may also be forwarded to the production system 110, for analysis at facial matching services 130 as well. Alternatively, the individual 12 may directly provide the enrollment image 14 and document image 16 to the production system 110.

In examples, the individual 12 providing the enrollment image 14 and document image 16 to the identity verification system 50 may be performed in response to an individual request to enroll in an identity service, for example to receive an identity document (e.g. a physical or virtual documents). Prior to submission of the biometric data, the individual may be requested, by an applicant assessment module 140 to perform one or more other validation tests to determine the aliveness of the individual, as well as to validate one or more other personal details of the individual to verify that he or she is the person associated with the specific biometric data.

At the production system 110, the facial matching service 130 may utilize a production biometric engine 120*a* to perform a matching process on the enrollment image 14 and document image 16. An output of the biometric engine 120*a* may correspond to a confidence of match between the two images. The production system 110 may have a configurable threshold at which the confidence corresponds to a match. For example, in some embodiments, a 45% confidence level corresponds to a match between the enrollment image 14 and the document image 16. In other examples, other percentages of confidence may be used to determine a match, and may be set at a level that balances risk of inaccurate positive matches with risk of inaccurate non-matches.

Additionally, at the imposter match testing system 100, one or more biometric engines may be used to perform matching processes as part of a separate facial matching service 130. In this example, each of the biometric engines 120*a-n* included within the facial matching service 130 of the imposter match testing system 100 may be executed using the same sets of biometric data to obtain correlated results. In particular examples, a true positive match rate may be determined for each biometric engine 120 by comparing the enrollment image 14 to the document image 16 for the same individual. As a large number of individuals use the identity verification system 50, statistics regarding the rate of true positive matches by each of the biometric engines may be captured in the match test results database 112 for later analysis.

Furthermore, because the identity verification system 50 will be used by multiple individuals concurrently, biometric data from other applicants may be maintained within the production system 110, for example within telemetry database 150, and provided to the imposter match testing system 100. For example, enrollment images of other individuals may be compared against the document image 16 of the individual. Such a comparison may be performed using each of the biometric engines 120*a-n*. By deliberately comparing biometric data, such as facial image data, from different individuals, a false positive rate may be determined for each of the biometric engines, and also stored in the match test results database 112.

In example implementations, the imposter match testing system 100 may be selectively activated or deactivated, such that its operation may be entirely obscured to the individual 12 submitting his or her biometric data. Furthermore, operation of the imposter match testing system 100 will not have any effect on the ultimate operation of the production system 110, since the biometric engine 120*a* maintained within the production system 110 operates independently of the imposter match testing system 100. Of course, in some embodiments, because the biometric engine 120*a*, corresponding to a production biometric engine, may already generate match results in the form of confidence levels, in some examples, the same biometric engine 120*a* may not be used within the imposter match testing system 100. Rather, that imposter match testing system 100 may only include other biometric engines (e.g. biometric engines 120*b-n*, also referred to as test biometric engines or candidate biometric engines), and the production system 110 may pass the results of biometric engine 120*a* to the imposter match testing system 100 for storage and match test results database alongside the results from the biometric engines 120*b-n*.

Although, in the context of the present disclosure, the live biometric engine performance assessment system 10 is utilized in conjunction with facial images, it is recognized that other types of biometric information may be used as well, depending on the specific implementation chosen. For example, biometric engines used to test and compare fingerprints, retinal scans, handprints, body images, or any other type of biometric data may be implemented similarly.

In example implementations, the individual 12 may access the identity verification system 50 remotely, for example via a user computing device such as mobile device 20. In alternative embodiments, the individual 12 may interact with the identity verification system 50 via operation of a computing system owned or affiliated with the identity verification system 50, for example at a service office of a governmental or corporate entity facilitating the identity verification enrollment process being performed.

Figure 2A:
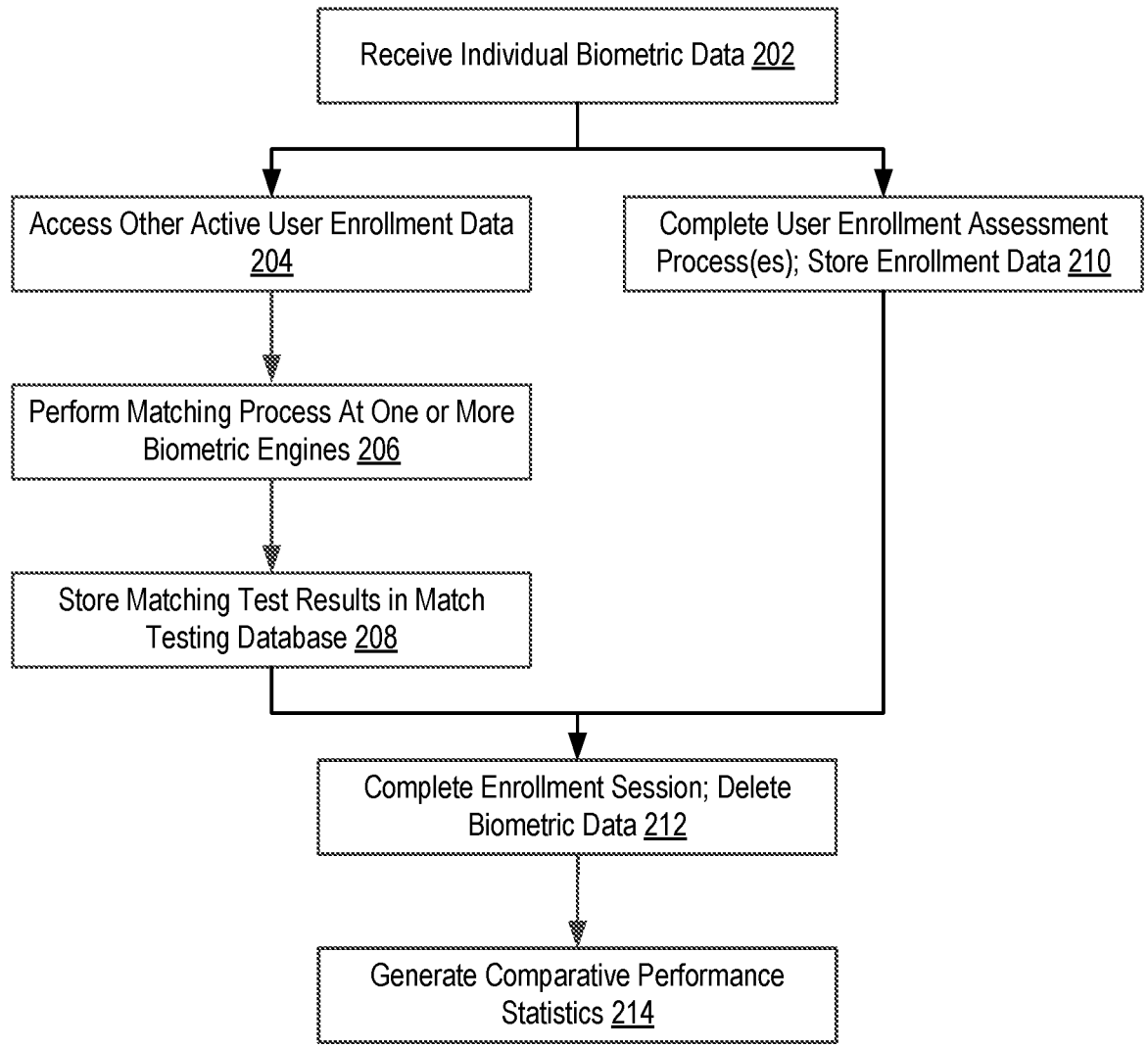
FIG. 2A illustrates a flowchart of a method of analyzing biometric engine performance concurrently with real-world use, according to an example embodiment.

FIG. 2A illustrates a flowchart of a method 200 of analyzing biometric engine performance concurrently with real-world use, according to an example embodiment. The method 200 may be performed, for example, using a biometric matching system such as may be utilized within the identity verification system 50 seen in FIG. 1. However, it is recognized that the method 200 is not so limited, and would be applicable in alternative embodiments in which analysis of biometric engine performance during live operation is desirable.

In the example shown, the method 200 includes receiving biometric data from an individual (step 202). Receiving biometric data from the individual can include receiving at least biometric enrollment data, referring to new biometric data from the individual to be used as part of an identity verification enrollment process. In some examples, receiving biometric data includes receiving both enrollment data and reference data, such as biometric data included on a reference document such as a facial image on a government identification document.

In some examples, the method 200 can also include accessing other active user enrollment data (step 204). Accessing other active user enrollment data may include accessing other data of the same individual, or accessing enrollment data of other individuals currently being processed through an enrollment process at an identity verification system that uses a biometric engine for biometric matching. The other data of the same individual may include demographic or identification information about the individual that is collected alongside the document biometric data (e.g. document facial image). The data of other individuals may include biometric enrollment data of other individuals currently submitted for identity verification.

In example implementations, accessing other active user enrollment data may include comparing demographic information known about the individual to known demographic information about other individuals currently being processed through the enrollment process, and selecting biometric data of other individuals who fall within a particularized demographic category for further analysis. For example, depending on a total number of individuals currently being processed, it may be determined that only enrollment images will be used from other users having common demographic information with the individual whose enrollment and document images are being assessed. This may correspond to others having a common gender and/or age range, or nationality (as a proxy for race or ethnicity).

The extent to which demographic data is used may vary depending on the total number of individuals concurrently being processed via the identity verification system 50, as well as the amount of time a test is desired to be run. In example implementations, it is preferable to have a significant amount of comparative data for accurate performance assessment. For example, it may be desirable to have at least 10,000, or up to 100,000 or more separate assessments of individual biometric data by each biometric engine to generate a reasonably reliable comparative performance measure. However, other amounts of test data may be used as well, and also may be based on the extent to which computational capacity is available for parallel biometric engine execution. As such, the extent to which demographic data is used may be tunable by an administrative user.

In the example shown, a matching process is performed at the one or more biometric engines (step 206). This may include performing a biometric analysis at the imposter match testing system 100, using each of the biometric engines 120a-n of the facial matching services 130 of that system, or alternatively may also include performing a biometric analysis using the biometric engine 120a of the production system 110. The matching process corresponds to a biometric matching analysis for a single biometric engine, and as described below in conjunction with FIG. 2B. However, it is noted that this biometric matching analysis is performed concurrently (or serially, but on the same data) using each of the biometric engines for which comparative analysis is desired.

In the example shown, the method 200 further includes storing matching test results in a match test results database 112 (step 208). The matching test results may include both true positive matching and false positive matching test results for each biometric engine to be tested.

In the example shown, and in the context of the identity verification system 50, and in particular an enrollment process used within such a system, a user enrollment may be completed (step 210), and enrollment data may be stored within a production system, for example in the telemetry database 150. The user enrollment may include not only performing the biometric matching using a production biometric engine 120a, but also the one or more applicant assessment operations performed by the applicant assessment module 140. Optionally, and as illustrated, the user enrollment process at step 210 may be performed in parallel with (e.g., concurrently with) the match testing results obtained in steps 204-208, as described above.

Optionally, additional operations are performed to gather information from the individual, the specific details of which may vary based on the type of enrollment and type of identification document or verification sought by the individual (step 212). In examples, completion of the user enrollment process may include sending an enrollment success message to one or more external systems for further processing. Upon completion of user enrollment, the biometric data associated with the individual may be deleted from the identity verification system 50, for example at least from the imposter match testing system 100.

In example implementations, the method 200 further includes generating comparative performance statistics to assess the relative performance of one or more biometric engines (step 214). In examples, a user interface may present a performance assessment graph, such as the diagram seen in FIG. 4, which charts a rate of true positive matches, as well as a rate of false positive matches. True positive matches occur when a confidence above a threshold is output by a biometric engine when comparing biometric data of the same individual (e.g., an enrollment image and a document image of the same individual, when considering facial images as the biometric data). False positive matches occur when a confidence above a threshold is output by the biometric engine when comparing biometric data of different individuals (e.g., an enrollment image of a different individual and a document image of the individual being enrolled).

Figure 2B:
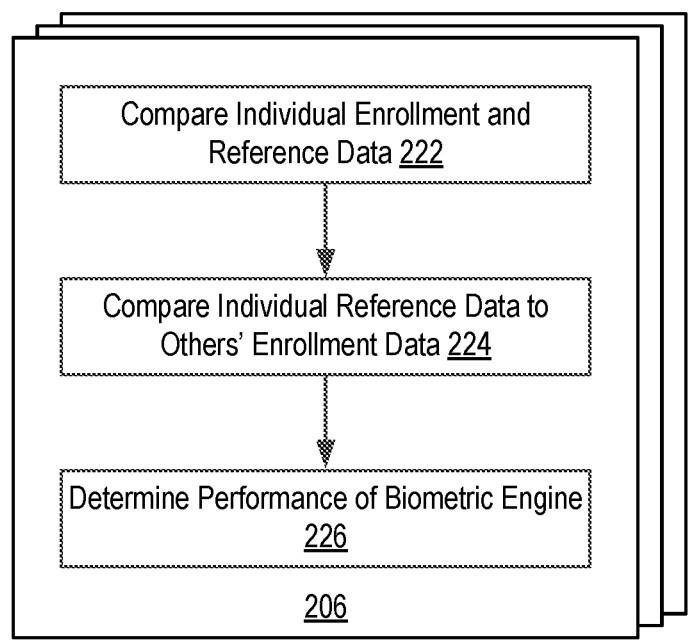
FIG. 2B illustrates an example biometric matching analysis performed by a selectable number of biometric engines in accordance with the method of FIG. 2A.

FIG. 2B illustrates an example biometric matching analysis performed by a selectable number of biometric engines in accordance with the method of FIG. 2A. The biometric matching analysis represents an example of step 206 of FIG. 2A, and may be performed concurrently for each biometric engine under assessment, or at least using the same biometric data for each biometric engine under assessment to ensure accurate comparison.

In the example shown, the biometric matching analysis includes comparing individual enrollment and reference data (step 222). In the facial image context described above in conjunction with FIG. 1, this biometric matching analysis may include comparing an enrollment image of an individual against a document image of the same individual using a biometric engine, and determining whether a match exists between the two images based on output confidence of match from the biometric engine. As noted above, and output confidence above a given threshold would represent a true match between the enrollment image in the document image, since they in fact represent the same individual.

The biometric matching analysis also includes comparing individual reference data against enrollment data of other users currently undergoing the enrollment process within the identity verification system 50 (step 224). This comparison identifies, or validates, that the biometric data of the individual is a non-match against the biometric data of other individuals. The enrollment data of other individuals currently undergoing the enrollment process is available within the identity verification system 50, since that information must be maintained for at least some time during the enrollment process. However, it is generally deleted after the enrollment process is completed, so the extent to which non-matches are assessed (and any false positives may be assessed) is limited to comparison against biometric data, such as enrollment images, that are currently maintained within that system. In this instance, depending on the number of other individuals currently undergoing the enrollment process, in some instances demographic data may be used to some select some individuals for comparison the of the biometric engine to determine whether false positives exist.

The biometric matching analysis further includes determining a performance of the selected biometric engine (step 226). This can include, for example, aggregating results of true positives and false positives detected four different individuals over time by a given biometric engine. By obtaining aggregated results to determine performance of the selected biometric engine, performance of different biometric engines may be compared, since they would be executed on the same sets of biometric data during live operation of the identity verification system 50.

Figure 3:
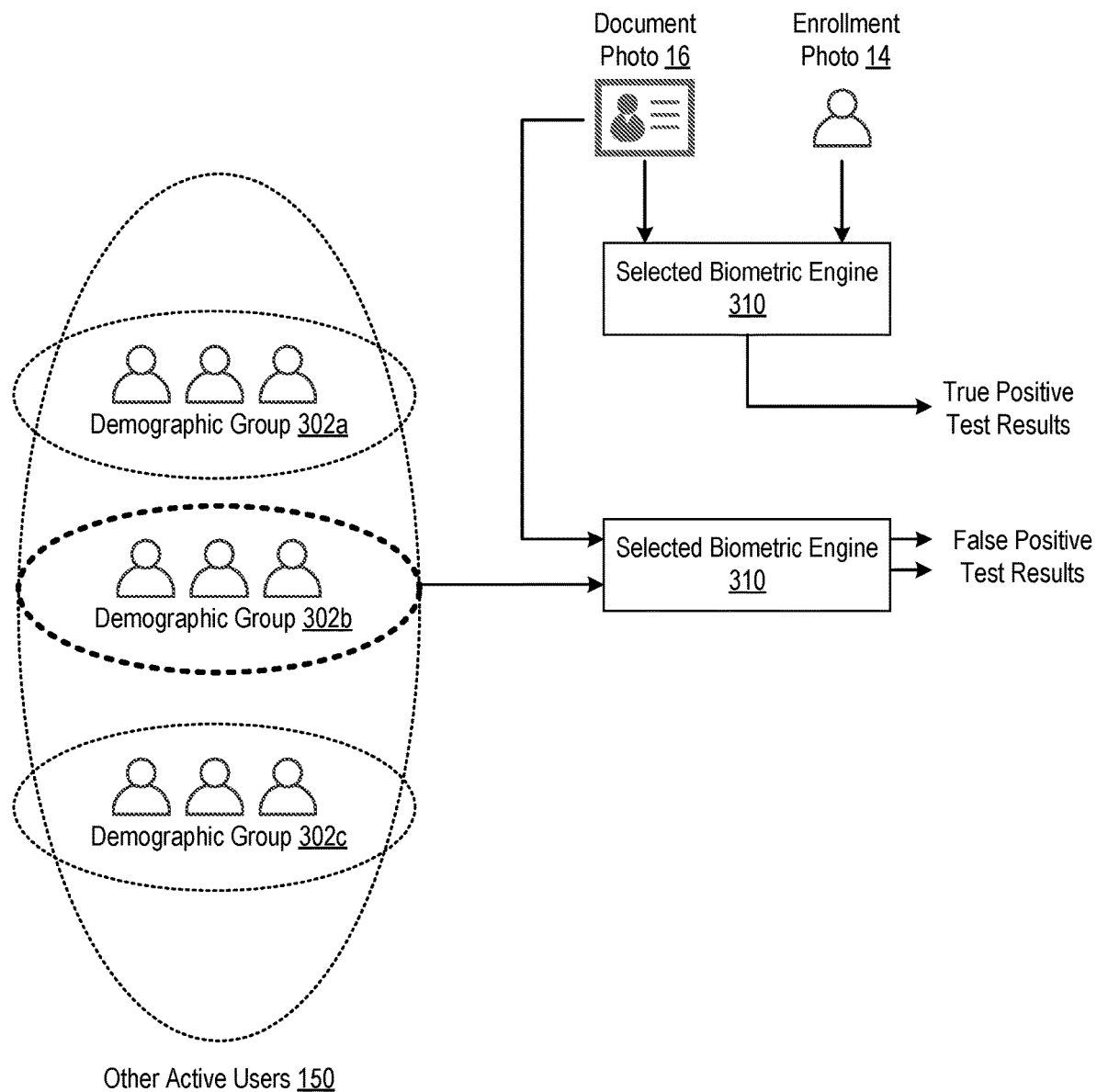
FIG. 3 is a logical diagram illustrating methods of selecting biometric data for use in biometric performance assessment from realtime-available biometric data, according to an example embodiment.

FIG. 3 is a logical diagram 300 illustrating methods of selecting biometric data for use in biometric performance assessment from realtime-available biometric data, according to an example embodiment. In this example, a selected biometric engine 310 (e.g., one of the biometric engines 102a-n noted above) may receive biometric data and reference biometric data from an individual. For example, the selected biometric engine 310 may receive an enrollment image 14 and a document image 16 to perform facial image analysis. As noted above in FIG. 2B, comparison of the enrollment image 14 to the document image 16 at the biometric engine 310 will result in a confidence of match between the two facial images. An output from the biometric engine 310 indicating a confidence above a threshold will correspond to a true positive test result.

In this example, the document image 16 may be rerouted to the same biometric engine 310, but done so repeatedly using, as a comparison, other biometric information, such as enrollment photos of other users within a demographic group. In the example shown a set of demographic groups 302a-c are shown as being included within the collection of other active user data in a telemetry database 150 of the identity verification system 50. In such instances, an output of the biometric engine indicating a match confidence above a given threshold corresponds to a false positive test result. Accordingly, for each potential true positive test result, there is a possibility of a number of false positive test results depending on the number of times the biometric engine is used to compare the document image 16 of one individual to enrollment photos of other individuals.

In the example shown, demographic group 302b is selected for comparison against the document image 16 at the biometric engine 310. However, in some instances, not all biometric data of individuals within the demographic group 302b may be selected. For example, in some instances, biometric data may be excluded is it is associated with an individual having a shared birthday with the individual associated with the document image. This eliminates, or at least reduces, a risk that the same individual submitted multiple of biometric data (e.g. in different communication sessions with the identity verification system 50), which may result in an inadvertent false positive that would typically be considered a true positive. Other ways of identifying and excluding potential duplicate biometric data for performing false positive analysis may be used as well.

Figure 4:
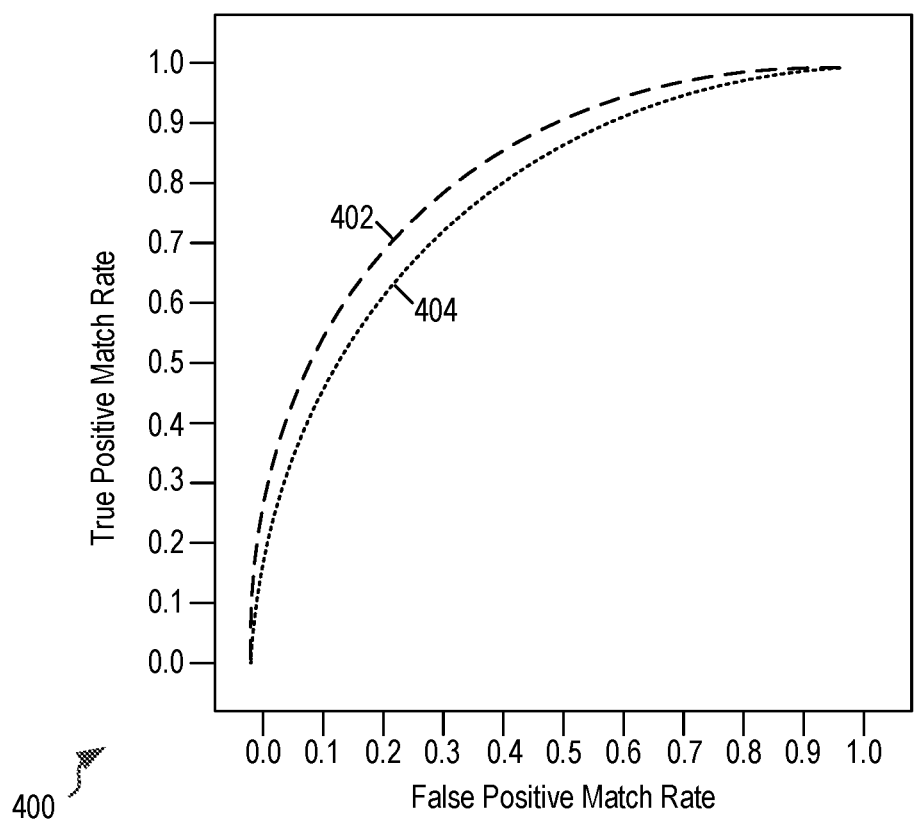
FIG. 4 is an example performance diagram showing comparative performance of two assessed biometric engines tested during real-world use, according to the examples described herein.

FIG. 4 is an example performance diagram 400 showing comparative performance of two assessed biometric engines tested during real-world use, according to the examples described herein. In the example shown, first and second performance curves 402, 404 are shown representing performance of two different biometric engines. In the example illustrated, both biometric engines are shown to exhibit a performance curve showing a ratio of true positive matches and false positive matches. In this example, the first performance curve 402 represents a biometric engine that has a higher proportion of true positive matches two false positive matches as compared to the second performance curve 404. As such, to the extent executed on the same biometric data, it could be seen that the biometric engine associated with the first performance curve 402 may experience superior performance as compared to the biometric engine associated with the second performance curve 404.

Although typically performed using two different biometric engines at the same time to generate two different performance curves, it may be possible to generate two different performance curves using the same biometric engine, but on different data at different times. In this way, it may be possible to determine a change in efficacy of a given biometric engine over time, for example as input data varies, or as performance of that biometric engine improves or degrades. However, this will be typically a secondary use of such comparative performance curves, since the curves are most directly comparable in instances where two biometric engines are executing using the same biometric data at the same time.

Additionally, by reviewing a performance curve of a given biometric engine, it is possible to identify a particular setting for that biometric engine that enables optimal performance. For example, an administrative user may select a given confidence threshold that balances true positive matches and false positive matches to maximize the likelihood of true positive matches and minimize the likelihood of false positive matches, depending on the comparative tolerance for a specific type of inaccuracy.

Figure 5:
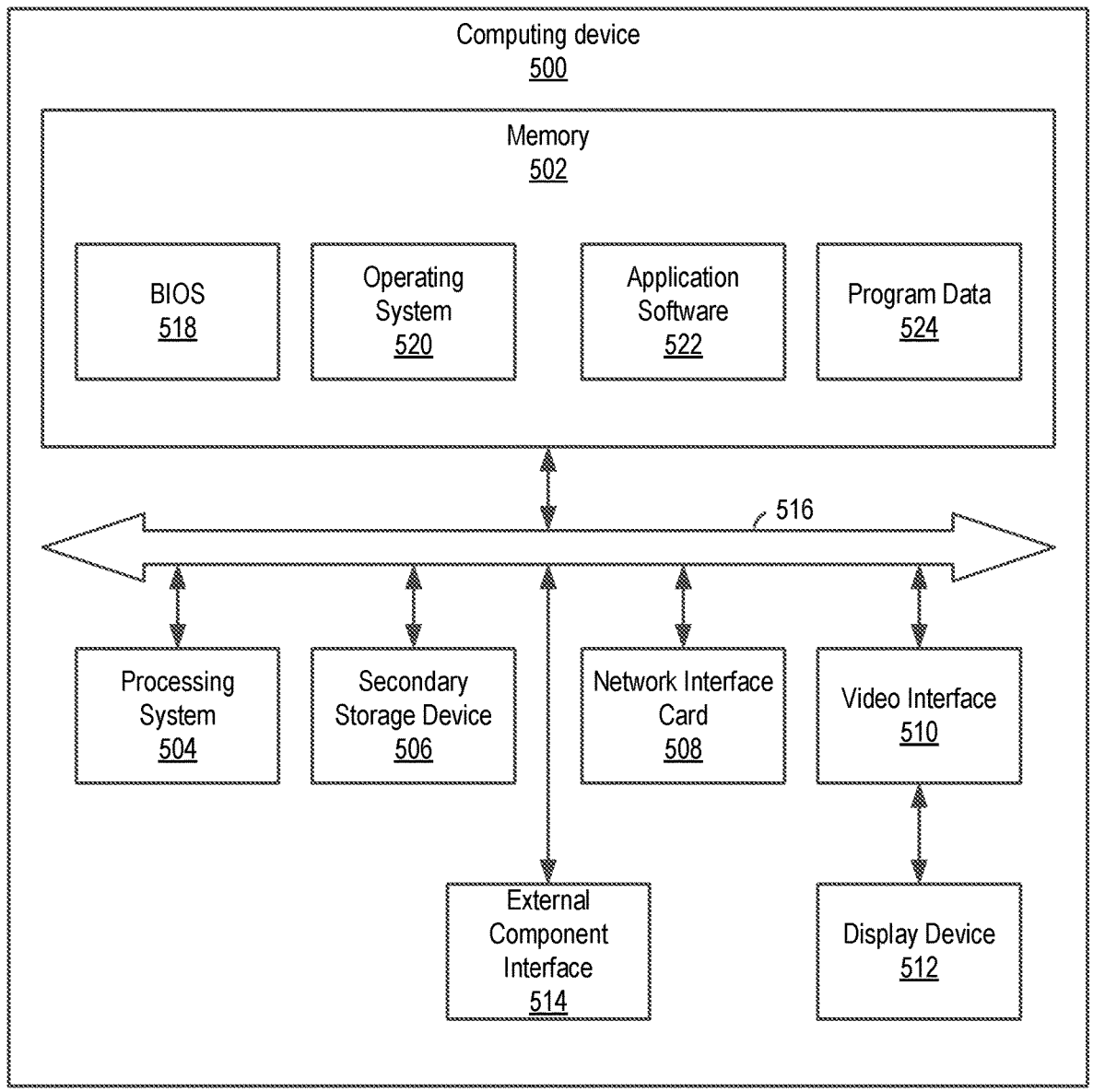
FIG. 5 illustrates an example computing device useable to implement aspects of the present disclosure.

FIG. 5 illustrates an example computing device with which aspects of the present disclosure can be implemented. The computing device 500 can be used, for example, to implement computing devices 20, 50, 100, 110 or any other computing device useable as described above in connection with FIG. 1.

In the example of FIG. 5, the computing device 500 includes a memory 502, a processing system 504, a secondary storage device 506, a network interface card 508, a video interface 510, a display unit 512, an external component interface 514, and a communication medium 516. The memory 502 includes one or more computer storage media capable of storing data and/or instructions. In different embodiments, the memory 502 is implemented in different ways. For example, the memory 502 can be implemented using various types of computer storage media, and generally includes at least some tangible media. In some embodiments, the memory 502 is implemented using entirely non-transitory media.

The processing system 504 includes one or more processing units, or programmable circuits. A processing unit is a physical device or article of manufacture comprising one or more integrated circuits that selectively execute software instructions. In various embodiments, the processing system 504 is implemented in various ways. For example, the processing system 504 can be implemented as one or more physical or logical processing cores. In another example, the processing system 504 can include one or more separate microprocessors. In yet another example embodiment, the processing system 504 can include an application-specific integrated circuit (ASIC) that provides specific functionality. In yet another example, the processing system 504 provides specific functionality by using an ASIC and by executing computer-executable instructions.

The secondary storage device 506 includes one or more computer storage media. The secondary storage device 506 stores data and software instructions not directly accessible by the processing system 504. In other words, the processing system 504 performs an I/O operation to retrieve data and/or software instructions from the secondary storage device 506. In various embodiments, the secondary storage device 506 includes various types of computer storage media. For example, the secondary storage device 506 can include one or more magnetic disks, magnetic tape drives, optical discs, solid-state memory devices, and/or other types of tangible computer storage media.

The network interface card 508 enables the computing device 500 to send data to and receive data from a communication network. In different embodiments, the network interface card 508 is implemented in different ways. For example, the network interface card 508 can be implemented as an Ethernet interface, a token-ring network interface, a fiber optic network interface, a wireless network interface (e.g., WiFi, WiMax, etc.), or another type of network interface.

In optional embodiments where included in the computing device 500, the video interface 510 enables the computing device 500 to output video information to the display unit 512. The display unit 512 can be various types of devices for displaying video information, such as an LCD display panel, a plasma screen display panel, a touch-sensitive display panel, an LED screen, a cathode-ray tube display, or a projector. The video interface 510 can communicate with the display unit 512 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 514 enables the computing device 500 to communicate with external devices.

For example, the external component interface 514 can be a USB interface, a FireWire interface, a serial port interface, a parallel port interface, a PS/2 interface, and/or another type of interface that enables the computing device 500 to communicate with external devices. In various embodiments, the external component interface 514 enables the computing device 500 to communicate with various external components, such as external storage devices, input devices, speakers, modems, media player docks, other computing devices, scanners, digital cameras, and fingerprint readers.

The communication medium 516 facilitates communication among the hardware components of the computing device 500. The communication medium 516 facilitates communication among the memory 502, the processing system 504, the secondary storage device 506, the network interface card 508, the video interface 510, and the external component interface 514. The communication medium 516 can be implemented in various ways. For example, the communication medium 516 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 502 stores various types of data and/or software instructions. The memory 502 stores a Basic Input/Output System (BIOS) 518 and an operating system 520. The BIOS 518 includes a set of computer-executable instructions that, when executed by the processing system 504, cause the computing device 500 to boot up. The operating system 520 includes a set of computer-executable instructions that, when executed by the processing system 504, cause the computing device 500 to provide an operating system that coordinates the activities and sharing of resources of the computing device 500. Furthermore, the memory 502 stores application software 522. The application software 522 includes computer-executable instructions, that when executed by the processing system 504, cause the computing device 500 to provide one or more applications. The memory 502 also stores program data 524. The program data 524 is data used by programs that execute on the computing device 500.

Although particular features are discussed herein as included within an electronic computing device 500, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

It is noted that, in some embodiments of the computing device 500 of FIG. 5, the computer-readable instructions are stored on devices that include non-transitory media. In particular embodiments, the computer-readable instructions are stored on entirely non-transitory media.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

The invention claimed is:

1. A method of assessing performance of a candidate biometric engine comprising:
    receiving biometric data of an individual at a biometric engine associated with an identity platform;
    comparing the biometric data to reference biometric data of the individual at the biometric engine to validate a match between the biometric data and the reference biometric data;
    comparing the reference biometric data of the individual against biometric data of one or more other individuals interacting with the identity platform concurrently with the individual to validate non-matches between the reference biometric data of the individual and the biometric data of the one or more other individuals; and
    determining, based on the validated match and the validated non-matches, a performance of the biometric engine concurrent with live operation of the biometric engine at the identity platform.

2. The method of claim 1, wherein the biometric data and the reference biometric data comprise facial images.

3. The method of claim 2, wherein the facial images included in the biometric data include an enrollment image and the reference biometric data comprises a document image obtained from an identification document.

4. The method of claim 3, further comprising receiving the document image of the individual alongside the enrollment image of the individual.

5. The method of claim 1, further comprising, for each of a plurality of different individuals, comparing biometric data and reference biometric data of a same individual at the biometric engine and determining, across the plurality of different individuals, a first matching rate between the biometric data and reference biometric data of the same individual by the biometric engine, the first matching rate corresponding to a true positive matching rate.

6. The method of claim 5, further comprising comparing biometric data of each of a plurality of different individuals against reference biometric data of others of the plurality of different individuals at the biometric engine, and determining, across the plurality of different individuals, a second matching rate between the biometric data of the plurality of individuals and reference biometric data of the others of the plurality of individuals by the biometric engine, the second matching rate corresponding to a false positive matching rate.

7. The method of claim 6, further comprising generating a graphical interface displaying a performance of the biometric engine including a true positive matching rate and a false positive matching rate.

8. The method of claim 7, further comprising:
for each of the plurality of different individuals, comparing biometric data and reference biometric data of a same individual at a second biometric engine and determining, across the plurality of different individuals, a third matching rate between the biometric data and reference biometric data of the same individual by the second biometric engine, the third matching rate corresponding to a second true positive matching rate;
comparing biometric data of each of the plurality of different individuals against reference biometric data of others of the plurality of different individuals at the second biometric engine, and determining, across the plurality of different individuals, a fourth matching rate between the biometric data of the plurality of individuals and reference biometric data of the others of the plurality of individuals by the second biometric engine, the fourth matching rate corresponding to a second false positive matching rate; and
displaying, on the graphical interface, a comparative performance of the second biometric engine alongside the performance of the biometric engine.

9. The method of claim 1, wherein the identity platform comprises a governmental identity enrollment platform.

10. The method of claim 1, further comprising:
based on validating the match between the biometric data and the reference biometric data, transmitting a message to register the individual with the identity management platform; and
deleting at least some of the biometric data and the reference biometric data at the identity management platform.

11. The method of claim 10, further comprising storing match results of a plurality of individuals in a telemetry database.

12. The method of claim 10, further comprising storing log information regarding true positive matches and false positive matches in a testing database.

13. A live biometric engine assessment system comprising:
a computing system including a memory and a processing unit, the memory storing instructions which, when executed, cause the computing system to:
receive biometric data of an individual at a biometric engine associated with an identity platform, the biometric data including enrollment data and reference data;
compare the enrollment data to the reference data of the individual at the biometric engine to validate a match between the biometric data and the reference data;
compare the reference data of the individual against enrollment data of one or more other individuals interacting with the identity platform concurrently with the individual to validate, at the biometric engine, non-matches between the reference data of the individual and the biometric data of the one or more other individuals; and
determine, based on the validated match and the validated non-matches, a performance of the biometric engine concurrent with live operation of the biometric engine at the identity platform.

14. The live biometric engine assessment system of claim 13, wherein the identity platform includes the biometric engine and a second biometric engine, and wherein the instructions further cause the computing system to:
compare the enrollment data to the reference data of the individual at the second biometric engine to validate a match between the biometric data and the reference data;
compare the reference data of the individual against enrollment data of one or more other individuals interacting with the identity platform concurrently with the individual to validate, at the second biometric engine, non-matches between the reference data of the individual and the biometric data of the one or more other individuals;
determine, based on the validated match and the validated non-matches, a performance of the second biometric engine concurrent with live operation of the biometric engine at the identity platform; and
compare performance of the biometric engine and the second biometric engine.

15. The live biometric engine assessment system of claim 14, wherein the biometric engine comprises a production biometric engine and the second biometric engine comprises a test biometric engine.

16. The live biometric engine assessment system of claim 15, wherein the enrollment data comprises an enrollment facial image of the individual and the reference data comprises a document facial image included on an identification document of the individual.

17. A live testing platform useable to test a plurality of biometric engines including at least a production biometric engine and a candidate biometric engine, the live testing platform comprising at least one computing system including a memory and a processing unit, the memory storing instructions which, when executed by the processing unit, cause the live testing platform to perform:
receiving image data of an individual at the production biometric engine and the candidate biometric engine, the image data including an enrollment image and a document image;
performing a reference biometric matching analysis, the reference biometric matching analysis comprising:
comparing the enrollment image of the individual to the document image of the individual at the production biometric engine to validate a match between the biometric data and the reference biometric data;
comparing other enrollment images of one or more other individuals interacting with the identity platform concurrently with the individual to the document image of the individual at the production biometric matching engine to validate non-matches between the other enrollment images and the document image;
determining, based on the validated match and the validated non-matches using the production biometric engine, a performance of the production biometric matching engine;
performing a candidate biometric matching analysis, the candidate biometric matching analysis comprising:
comparing the enrollment image of the individual to the document image of the individual at the candidate biometric engine to validate a match between the biometric data and the reference biometric data;

comparing other enrollment images of the one or more other individuals interacting with the identity platform concurrently with the individual to the document image of the individual at the candidate biometric engine to validate non-matches between the other enrollment images and the document image; and determining, based on the validated match and the validated non-matches using the candidate biometric engine, a performance of the candidate biometric engine; and comparing performance of the candidate biometric engine to the production biometric engine.

18. The live testing platform of claim 17, wherein the instructions further cause the live testing platform to store information regarding the reference biometric matching analysis and the candidate biometric matching analysis in a database.

19. The live testing platform of claim 17, wherein the live testing platform includes an imposter match testing system and a production system, the production system including a facial matching service and an applicant assessment engine, the facial matching service including at least the production biometric matching engine, and the applicant assessment engine configured to perform one or more additional identity verification processes for each individual.

20. The live testing platform of claim 19, further comprising, upon completion of operation of the facial matching service and the one or more additional identity verification processes for an individual, deleting the image data of the individual from the live testing platform.

21. The live testing platform of claim 17, wherein the instructions cause the live testing platform to perform, for each of a plurality of individuals, the reference biometric matching analysis and the candidate biometric matching analysis concurrently on a same set of biometric data including the document image of the individual, the enrollment image of the individual, and the enrollment images of the one or more other individuals.

* * * * *